(12) United States Patent
Lavallée et al.

(10) Patent No.: US 10,982,079 B2
(45) Date of Patent: Apr. 20, 2021

(54) POLY(OXYALKYLENE) POLYMER PROCESSING ADDITIVE, COMPOSITIONS, AND METHODS

(71) Applicant: 3M INNOVATIVE PROPERTIES COMPANY, St. Paul, MN (US)

(72) Inventors: Claude Lavallée, Maplewood, MN (US); Shireen A. Mamun, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/537,506

(22) PCT Filed: Dec. 17, 2015

(86) PCT No.: PCT/US2015/066423
§ 371 (c)(1),
(2) Date: Jun. 19, 2017

(87) PCT Pub. No.: WO2016/100691
PCT Pub. Date: Jun. 23, 2016

(65) Prior Publication Data
US 2017/0342245 A1 Nov. 30, 2017

Related U.S. Application Data

(60) Provisional application No. 62/094,633, filed on Dec. 19, 2014.

(51) Int. Cl.
| | |
|---|---|
| *C08L 23/06* | (2006.01) |
| *C08L 23/04* | (2006.01) |
| *C08L 23/08* | (2006.01) |
| *C08K 5/098* | (2006.01) |
| *C08L 71/02* | (2006.01) |
| *C08K 5/42* | (2006.01) |
| *C08K 5/521* | (2006.01) |

(52) U.S. Cl.
CPC ............. *C08L 23/06* (2013.01); *C08K 5/098* (2013.01); *C08K 5/42* (2013.01); *C08K 5/521* (2013.01); *C08L 23/04* (2013.01); *C08L 23/0815* (2013.01); *C08L 71/02* (2013.01); *C08L 2205/02* (2013.01); *C08L 2205/03* (2013.01); *C08L 2205/06* (2013.01)

(58) Field of Classification Search
CPC ...... C08L 23/06; C08L 23/04; C08L 23/0815; C08L 71/02; C08K 5/098; C08K 5/42; C08K 5/521
See application file for complete search history.

(56) References Cited

U.S. PATENT DOCUMENTS

| | | |
|---|---|---|
| 2,968,649 A | 1/1961 | Pailthorp |
| 3,051,677 A | 8/1962 | Rexford |
| 3,318,854 A | 5/1967 | Honn |
| 3,326,984 A | 6/1967 | Anderson |
| 4,141,874 A | 2/1979 | Oka |
| 4,273,728 A | 6/1981 | Krespan |
| 4,534,799 A | 8/1985 | Aguirre |
| 4,535,113 A | 8/1985 | Foster |
| 4,540,538 A | 9/1985 | Corwin |
| 4,558,141 A | 12/1985 | Squire |
| 4,829,116 A | 5/1989 | Piesold |
| 4,840,994 A | 6/1989 | Moggi |
| 4,855,360 A | 8/1989 | Duchesne |
| 4,900,474 A | 2/1990 | Terae |
| 4,904,735 A | 2/1990 | Chapman, Jr. |
| 5,010,130 A | 4/1991 | Chapman, Jr. |
| 5,013,792 A | 5/1991 | Chapman, Jr. |
| 5,015,693 A | 5/1991 | Duchesne |
| 5,028,679 A | 7/1991 | Terae |
| 5,061,759 A | 10/1991 | Tommasi |
| 5,064,594 A | 11/1991 | Priester |
| 5,089,200 A | 2/1992 | Chapman, Jr. |
| 5,093,400 A | 3/1992 | Arcella |
| 5,106,911 A | 4/1992 | Chapman, Jr. |
| 5,118,775 A | 6/1992 | Inomata |

(Continued)

FOREIGN PATENT DOCUMENTS

| | | |
|---|---|---|
| CN | 101891914 | 11/2010 |
| DE | 4421420 | 12/1995 |

(Continued)

OTHER PUBLICATIONS

English machine translation of JP 08-157650 (Year: 1996).*
Ittel, "Late-Metal Catalysts for Ethylene Homo- and Copolymerization", Chemical Reviews, 2000, vol. 100, pp. 1169-1203.
Johnson, "The influence of Polyolefin Additives on the Performance of Fluorocarbon Elastomer Process Aids", SPE ANTEC, Apr. 18-21, 1988, Atlanta, pp. 1425-1429.
Johnson; "Factors Affecting the Interaction of Polyolefin Additives with Fluorocarbon Elastomer Polymer Processing Aids", TAPPI Polymers, Laminations and Coatings Conference, Sep. 13-16, 1998, Atlanta, Georgia, 12pgs.
Kanu, "Rheology of Polymer Blends: Simultaneous Slippage and Entrance Pressure Loss in the Ethylene-Propylene-Diene (EPDM)/Viton System", Polymer Engineering and Science, Mid-June, 1982, vol. 22, No. 8, pp. 507-511.

(Continued)

*Primary Examiner* — John E Uselding
(74) *Attorney, Agent, or Firm* — Kathleen B. Gross

(57) ABSTRACT

A poly(oxyalkylene) polymer having a weight average molecular weight of at least 50,000 grams per mole and a metal salt of a carboxylic acid, sulfonic acid, or alkylsulfate, in combination are useful as a polymer processing additive. In some embodiments, the polymer processing additive further includes a poly(oxyalkylene) polymer having a weight average molecular weight of up to 20,000 grams per mole Polymer processing additive compositions and thermoplastic, for example, polyolefin, compositions including a poly(oxyalkylene) polymer and a metal salt of a carboxylic acid, sulfonic acid, or alkylsulfate are disclosed. Methods of reducing melt defects during the extrusion of a thermoplastic polymer, which may be a homogeneously catalyzed polyolefin, are also disclosed.

17 Claims, No Drawings

(56) References Cited

U.S. PATENT DOCUMENTS

| | | | |
|---|---|---|---|
| 5,132,368 A | 7/1992 | Chapman, Jr. | |
| 5,155,282 A | 10/1992 | Marchionni | |
| 5,236,997 A | 8/1993 | Fujiki | |
| 5,244,955 A | 9/1993 | Toyoda | |
| 5,266,639 A | 11/1993 | Chapman, Jr. | |
| 5,284,184 A | 2/1994 | Noone | |
| 5,397,829 A | 3/1995 | Morgan | |
| 5,442,097 A | 8/1995 | Obermeier | |
| 5,464,904 A | 11/1995 | Chapman, Jr. | |
| 5,527,858 A | 6/1996 | Blong | |
| 5,550,193 A | 8/1996 | Chiu | |
| 5,587,429 A | 12/1996 | Priester | |
| 5,710,217 A | 1/1998 | Blong | |
| 5,719,209 A | 2/1998 | Miller | |
| 6,147,146 A * | 11/2000 | Horio | C08K 5/098 524/100 |
| 6,277,919 B1 | 8/2001 | Dillon | |
| 6,294,604 B1 | 9/2001 | Focquet | |
| 6,300,526 B1 | 10/2001 | Navarrini | |
| 6,380,313 B1 | 4/2002 | Dillon | |
| 6,599,982 B2 | 7/2003 | Oriani | |
| 6,613,941 B1 | 9/2003 | Felix | |
| 6,706,193 B1 | 3/2004 | Burkard | |
| 6,734,252 B1 | 5/2004 | Woods | |
| 6,780,481 B1 | 8/2004 | Lavallée | |
| 6,794,550 B2 | 9/2004 | Hintzer | |
| 6,818,695 B2 | 11/2004 | Dillon | |
| 6,894,118 B2 | 5/2005 | Chapman, Jr. | |
| 6,906,137 B2 | 6/2005 | Oriani | |
| 7,001,951 B2 | 2/2006 | Chapman, Jr. | |
| 7,018,541 B2 | 3/2006 | Hintzer | |
| 7,375,157 B2 | 5/2008 | Amos | |
| 7,420,010 B2 | 9/2008 | Sukhadia | |
| 7,488,838 B2 | 2/2009 | Daute | |
| 8,501,862 B2 | 8/2013 | Bonnet | |
| 9,938,402 B2 | 4/2018 | Byravan | |
| 2005/0043456 A1 * | 2/2005 | Oriani | C08L 23/0815 524/285 |
| 2005/0070644 A1 * | 3/2005 | Tikuisis | C08L 23/0815 524/115 |
| 2005/0101722 A1 | 5/2005 | Briers | |
| 2005/0245687 A1 | 11/2005 | Appel | |
| 2005/0281973 A1 | 12/2005 | Park | |
| 2009/0197028 A1 | 8/2009 | Lyons | |
| 2010/0216923 A1 | 8/2010 | Stevenson | |
| 2010/0311906 A1 * | 12/2010 | Lavallee | B29C 47/0004 525/55 |
| 2011/0172338 A1 | 7/2011 | Murakami | |
| 2011/0244159 A1 | 10/2011 | Papp | |
| 2015/0240043 A1 | 8/2015 | Yoshida | |
| 2016/0229994 A1 | 8/2016 | Lavallée | |

FOREIGN PATENT DOCUMENTS

| | | | | |
|---|---|---|---|---|
| JP | 08-157650 | * | 6/1996 | C08L 23/00 |
| RU | 2376331 | | 12/2009 | |
| WO | WO-9426816 A1 | * | 11/1994 | C08F 10/00 |
| WO | 2010-024602 | | 3/2010 | |
| WO | 2013-078534 | | 6/2013 | |

OTHER PUBLICATIONS

Morris, "Metallic Stearates: A Review of Their Function and Use As Release Agents for Rubber Compounds", HallStar Technical Publication, 11 pages.

B.V. Johnson, T.J. Blong, J.M. Kunde, D. Duchesne; *Factors Affecting the Interactions of Polyolefin Additives with Fluorocaron Elastomer Processing Aids*, TAPPI PLC Conference, Sep. 13, 1988, 11 pages.

J. Horns, E. Adair; *The Effect Fluoropolymer Processing Additive and Stearate Additive Levels Have on Processing of HDPE Resins*, Dyneon Paper 98-0504-1084-8, (Oct. 2001), 11 pages.

T. Blong, K. Fronek, B. Johnson, D. Klein, J. Kunde; *Processing Additives and Acid Neutralizers—Formulation Options in Polyolefins*, SPE Polyolefins VII International Conference, Feb. 27, 1991, 15 pages.

Kulikov, "Low Viscous Hydrophilic Processing Additives for Extrusion of Polyethylene at Reduced Temperatures"; Polymer Engineering and Science, 2010, pp. 1236-1252.

Rauwendaal, Polymer Extrusion, 1986, 23-48.

Westover, Melt Extrusion, Encyclopedia of Polymer Science and Technology, 1968, vol. 8, pp. 573-581.

International Search Report for PCT International Application No. PCT/US2015/066423, dated Mar. 14, 2016, 4 pgs.

* cited by examiner

POLY(OXYALKYLENE) POLYMER PROCESSING ADDITIVE, COMPOSITIONS, AND METHODS

CROSS REFERENCE TO RELATED APPLICATION

This application is a national stage filing under 35 U.S.C. 371 of PCT/US2015/066423, filed Dec. 17, 2015, which claims priority to U.S. Provisional Application No. 62/094,633, filed Dec. 19, 2014, the disclosure of which is incorporated by reference in its entirety herein.

BACKGROUND

Extrusion of polymeric materials in the formation and shaping of articles is a major segment of the plastic or polymeric articles industry. The quality of the extruded article and the overall success of the extrusion process are typically influenced by the interaction of the fluid material with the extrusion die. For any melt-processable thermoplastic polymer composition, there exists a critical shear rate above which the surface of the extrudate becomes rough or distorted and below which the extrudate will be smooth. See, for example, R. F. Westover, Melt Extrusion, Encyclopedia of Polymer Science and Technology, vol. 8, pp. 573-81 (John Wiley & Sons 1968). The desire for a smooth extrudate surface competes, and must be optimized with respect to, the economic advantages of extruding a polymer composition at the fastest possible speed (for example at high shear rates).

At low shear rates, defects in extruded thermoplastics may take the form of "sharkskin", which is a loss of surface gloss that in more serious manifestations appears as ridges running more or less transverse to the extrusion direction. At higher rates, the extrudate can undergo "continuous melt fracture", becoming grossly distorted. At rates lower than those at which continuous melt fracture is first observed, certain thermoplastics can also suffer from "cyclic melt fracture", in which the extrudate surface varies from smooth to rough.

There are other problems often encountered during the extrusion of thermoplastic polymers. They include a build-up of the polymer at the orifice of the die (known as die build up or die drool), high back pressure during extrusion runs, and excessive degradation or low melt strength of the polymer due to high extrusion temperatures. These problems slow the extrusion process either because the process must be stopped to clean the equipment or because the process must be run at a lower speed.

The use of polyethylene glycol in extrusion processing of thermoplastics has been described. See, for example, U.S. Pat. No. 4,540,538 (Corwin et al.) and U.S. Pat. Pub. No. 2005/0070644 (Tikuisis et al.). U.S. Pat. No. 5,015,693 (Duchesne et al.) discloses that a combination of a fluoropolymer and a poly(oxyalkylene) polymer is more effective than a fluoropolymer alone for reducing melt defects under certain conditions. However, polyethylene glycols having molecular weights of 400 Da and 3350 Da used in the absence of fluoropolymer were not effective under the same conditions. U.S. Pat. No. 6,294,604 (Focquet et al.) describes a combination of a fluoropolymer, a poly(oxyalkylene) polymer, and magnesium oxide as an extrusion additive.

SUMMARY

Poly(oxyalkylene) polymers with relatively high molecular weights are not commonly used as polymer processing additives because of their lack of thermal stability, for example. We have discovered that combinations of a poly(oxyalkylene) polymer (e.g., a polyethylene glycol) and a metal salt of a carboxylic acid, a sulfonic acid, or an alkylsulfate typically have significantly higher thermal stability than the poly(oxyalkylene) polymer alone. The present disclosure describes that a combination of a relatively high molecular weight poly(oxyalkylene) polymer and a metal salt of a carboxylic acid, a sulfonic acid, or an alkylsulfate can provide, for example, an effective polymer processing additive. Also, the present disclosure describes that a combination of first and second poly(oxyalkylene) polymers having different molecular weights and a metal salt of a carboxylic acid, a sulfonic acid, or an alkylsulfate can provide, for example, an effective polymer processing additive.

Thus, in one aspect, the present disclosure provides a thermoplastic composition including a polyolefin and a polymer processing additive composition including a first poly(oxyalkylene) polymer and a metal salt of a carboxylic acid, sulfonic acid, or alkylsulfate. The first poly(oxyalkylene) polymer has a weight average molecular weight of at least about 50,000 grams per mole. In some embodiments, the polymer processing additive composition further comprises a second poly(oxyalkylene) polymer having a weight average molecular weight of up to about 20,000 grams per mole.

In another aspect, the present disclosure provides a method of reducing melt defects during extrusion of a polyolefin. The method includes providing the aforementioned thermoplastic composition or combining a polyolefin and a polymer processing additive including a first poly(oxyalkylene) polymer having a weight average molecular weight of at least about 50,000 grams per mole and a metal salt of a carboxylic acid, sulfonic acid, or alkylsulfate to provide an extrudable composition. The method further includes extruding the extrudable composition.

In another aspect, the present disclosure provides a method of reducing melt defects during extrusion of a polyolefin. The method includes providing a polymer processing additive composition comprising a first poly(oxyalkylene) polymer having a weight average molecular weight of at least about 50,000 grams per mole and a metal salt of a carboxylic acid, sulfonic acid, or alkylsulfate; providing an extrudable polymer; admixing the polymer processing additive composition and the extrudable polymer to provide an extrudable composition; and extruding the composition.

In another aspect, the present disclosure provides a polymer processing additive composition that includes a first poly(oxyalkylene) polymer having a weight average molecular weight of at least about 50,000 grams per mole, a second poly(oxyalkylene) polymer having a weight average molecular weight of up to about 20,000 grams per mole; and a metal salt of a carboxylic acid, sulfonic acid, or alkylsulfate. Accordingly, the present disclosure provides the use of a composition including a first poly(oxyalkylene) polymer having a weight average molecular weight of at least about 50,000 grams per mole, a second poly(oxyalkylene) polymer having a weight average molecular weight of up to about 20,000 grams per mole, and a metal salt of a carboxylic acid, sulfonic acid, or alkylsulfate as a polymer processing additive composition.

In another aspect, the present disclosure provides a polymer processing additive that includes a first poly(oxyalkylene) polymer having a weight average molecular weight of at least about 50,000 grams per mole and a metal salt of a carboxylic acid, sulfonic acid, or alkylsulfate. The polymer processing additive is essentially free of fluoropolymers, silicones, and polyolefins. Accordingly, the present disclosure provides the use of a poly(oxyalkylene) having a weight average molecular weight of at least about 50,000 grams per mole polymer and a metal salt of a carboxylic acid, sulfonic acid, or alkylsulfate as a polymer processing additive.

As described below, combinations of a poly(oxyalkylene) polymer (e.g., a polyethylene glycol) and a metal salt of a carboxylic acid, a sulfonic acid, or an alkylsulfate typically have higher thermal stability than a combination of poly (oxyalkylene) polymer and magnesium oxide. Furthermore, combinations of a poly(oxyalkylene) polymer (e.g., a polyethylene glycol) and a metal salt of a carboxylic acid, a sulfonic acid, or an alkylsulfate typically have higher thermal stability than a combination of poly(oxyalkylene) polymer and certain conventional antioxidants.

Also, as described below, a polymer processing additive disclosed herein including a first poly(oxyalkylene) polymer, optionally a second poly(oxyalkylene) polymer, and a metal salt of a carboxylic acid, sulfonic acid, or alkylsulfate is useful as a polymer processing additive, for example, in the absence of conventional fluoropolymer polymer processing additives.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

"Alkyl group" and the prefix "alk-" are inclusive of both straight chain and branched chain groups and of cyclic groups having up to 30 carbons (in some embodiments, up to 20, 15, 12, 10, 8, 7, 6, or 5 carbons) unless otherwise specified. Cyclic groups can be monocyclic or polycyclic and, in some embodiments, have from 3 to 10 ring carbon atoms.

The phrase "interrupted by one or more ether linkages", for example, with regard to an alkyl, alkylene, or arylalkylene refers to having part of the alkyl, alkylene, or arylalkylene on both sides of the functional group. An example of an alkylene that is interrupted with —O— is —CH$_2$—CH$_2$—O—CH$_2$—CH$_2$—.

The term "aryl" as used herein includes carbocyclic aromatic rings or ring systems, for example, having 1, 2, or 3 rings, optionally containing at least one heteroatom (e.g., O, S, or N) in the ring, and optionally substituted by up to five substituents including one or more alkyl groups having up to 4 carbon atoms (e.g., methyl or ethyl), alkoxy having up to 4 carbon atoms, halo (i.e., fluoro, chloro, bromo or iodo), hydroxy, or nitro groups. Examples of aryl groups include phenyl, naphthyl, biphenyl, fluorenyl as well as furyl, thienyl, oxazolyl, and thiazolyl. "Arylalkylene" refers to an "alkylene" moiety to which an aryl group is attached. "Alkylarylene" refers to an "arylene" moiety to which an alkyl group is attached.

All numerical ranges are inclusive of their endpoints and nonintegral values between the endpoints unless otherwise stated (e.g., 1 to 5 includes 1, 1.5, 2, 2.75, 3, 3.80, 4, 5, etc.).

Various aspects and advantages of embodiments of the present disclosure have been summarized. The above Summary is not intended to describe each illustrated embodiment or every implementation of the present disclosure.

DETAILED DESCRIPTION

The first and second poly(oxyalkylene) polymers whose thermal stability can be enhanced with a metal salt of a carboxylic acid, sulfonic acid, or alkylsulfate can be represented by formula A[(OR$^1$)$_x$OR$^2$]$_y$, wherein A is typically alkylene interrupted by one or more ether linkages, y is 2 or 3, (OR$^1$)$_x$ is a poly(oxyalkylene) chain having a plurality (x) of oxyalkylene groups, OR$^1$, wherein each R$^1$ is independently C$_2$ to C$_5$ alkylene, in some embodiments, C$_2$ to C$_3$ alkylene, R$^2$ is hydrogen, alkyl, aryl, arylalkenyl, alkylarylenyl, —C(O)-alkyl, —C(O)-aryl, —C(O)-arylalkenyl, or —C(O)-alkylarylenyl, wherein —C(O)— is bonded to the O of OR$^2$. The first and/or second poly(oxyalkylene) polymers can be a homopolymers such as poly (oxyethylene) in which each R$^1$ is —CH$_2$CH$_2$—, or poly(oxypropylene), in which each R$^1$ is —C$_3$H$_6$—. Or the first and/or second poly (oxyalkylene) polymer can be a chain of randomly distributed oxyalkylene groups (e.g., a copolymer —OC$_2$H$_4$— and —OC$_3$H$_6$— units) or having alternating blocks of repeating oxyalkylene groups (e.g., a polymer comprising (—OC$_2$H$_4$—)$_a$ and (—OC$_3$H$_6$—)$_b$ blocks, wherein a+b is x, as described below in any of the embodiments of x. In some embodiments, A is ethylene, —CH$_2$—CH(—)—CH$_2$— (derived from glycerol), CH$_3$CH$_2$C(CH$_2$—)$_3$ (derived from 1,1,1-trimethylol propane), poly(oxypropylene), —CH$_2$CH$_2$—O—CH$_2$CH$_2$—, or —CH$_2$CH$_2$—O—CH$_2$CH$_2$—O—CH$_2$CH$_2$—. In some embodiments, R$^2$ is hydrogen, methyl, butyl, phenyl, benzyl, acetyl, benzoyl, or stearyl. Other useful poly(oxyalkylene) polymers are polyesters prepared, for example, from dicarboxylic acids and poly(oxyalkylene) polymers represented by formula A[(OR$^1$)$_x$OR$^2$]$_y$, wherein A, R$^1$, and x are as defined above, R$^2$ is hydrogen, and y is 2. Typically, the major proportion of the first and/or second poly(oxyalkylene) polymer by weight will be the repeating oxyalkylene groups, (OR$^1$).

In some embodiments, the first and second poly(oxyalkylene) polymers whose thermal stability can be enhanced with a metal salt of a carboxylic acid, sulfonic acid, or alkylsulfate are polyethylene glycols and their derivatives. Polyethylene glycol (PEG) can be represented by formula H(OC$_2$H$_4$)$_x$.OH. Many of these polyethylene glycols, their ethers, and their esters are commercially available from a variety of sources.

In some embodiments of the poly(oxyalkylene) and polyethylene glycol polymers described above, the variables "x" and "x" are selected such that the weight average molecular weight of the first poly(oxyalkylene) polymer is at least about 50,000 grams per mole. In some embodiments, the weight average molecular weight of the first poly(oxyalkylene) polymer is at least about 60,000 grams per mole, 70,000 grams per mole, 75,000 grams per mole, 80,000 grams per mole, or 85,000 grams per mole. In some embodiments, the weight average molecular weight of the first poly(oxyalkylene) polymer is up to about 500,000 grams per mole, about 450,000 grams per mole, about 400,000 grams per mole, about 350,000 grams per mole, about 300,000 grams per mole, or about 250,000 grams per mole. Thus, in some of these embodiments, in the formula A[(OR$^1$)$_x$OR$^2$]$_y$, x and "a+b" can be in a range from in a range from about 500 to about 6,000 or about 500 to about 5,000. In some embodiments of formula H(OC$_2$H$_4$)$_{x'}$OH, x' can be in a range from about 1000 to about 12,000 or about 1000 to about 10,000.

Weight average molecular weights can be measured, for example, by gel permeation chromatography (i.e., size exclusion chromatography) using polyethylene oxide standards with techniques known in the art. For the purposes of the present disclosure, the test method described in the Examples, below, is used.

The first poly(oxyalkylene) polymer (e.g., the molecular weight of the poly(oxyalkylene) polymer) may be selected for its performance as a polymer processing additive. The first poly(oxyalkylene) polymer may be selected such that it melt-processable, for example, it is in the liquid state (or molten) at a desired extrusion temperature. Melt-processing typically is performed at a temperature from 180° C. to 280° C., although optimum operating temperatures may be selected depending upon the melting point, melt viscosity, thermal stability of the composition, and the type of melt-processing equipment used. The first poly(oxyalkylene) polymer may also be selected such that it has a compatible melt viscosity with the host polymer. For example, the first poly(oxyalkylene) polymer may have a melt viscosity within an order of magnitude of the melt viscosity of the host polymer when viscosity is measured using a parallel plate rheometer according to the test method in the Examples, below. In some embodiments, the first poly(oxyalkylene) polymer has a lower melt viscosity than the host polymer. In some embodiments, the first poly(oxyalkylene) polymer has a melt viscosity (eta') in a range from 1000 Pa·s to 100,000 Pa·s at a frequency of 1 rad/s and a temperature of 190° C.

Some embodiments of the compositions and methods according to the present disclosure include a second poly(oxyalkylene) polymer. In some embodiments of the poly(oxyalkylene) and polyethylene glycol polymers described above, the variables "x" and "x'" are selected such that the weight average molecular weight of the second poly(oxyalkylene) polymer is about 200 to about 20,000 grams per mole (g/mol), in some embodiments about 400 to about 15,000 g/mol. Thus, in the formula $A[(OR^1)_xOR^2]_y$, x and "a+b" can be in a range from in a range from about 3 to 250 or about 10 to 225 in some of these embodiments. In formula $H(OC_2H_4)_{x'}OH$, x' can be in a range from in a range from about 3 to 500 or about 10 to 450 in some of these embodiments. As shown in the Examples, below, a blend of the first and second poly(oxyalkylene) polymers with the metal salt is surprisingly more effective at reducing the time to clear melt fracture during extrusion of a film than when the first poly(oxyalkylene) polymer and metal salt are used in the absence of the second poly(oxyalkylene) polymer.

Because of the different weight average molecular weights of the first and second poly(oxyalkylene) polymers, the melt viscosity of the second poly(oxyalkylene) polymer is lower than that of the first poly(oxyalkylene) polymer. The difference in weight average molecular weight between the two polymer processing additives can be in a range from 2:1 to $10^6$:1, in some embodiments, 5:1 to $10^6$:1, 2:1 to $10^3$:1, 5:1 to $10^3$:1, 2:1 to 500:1, or 5:1 to 500:1. Although not wishing to be bound by theory, in some embodiments, the second poly(oxyalkylene) polymer may wet the surface or otherwise associate with the surface of the first poly(oxyalkylene) polymer in extrudable compositions.

In embodiments that include a blend of first and second poly(oxyalkylene) polymers, the weight average molecular weight of the first poly(oxyalkylene) polymer can be up to about 1,500,000 grams per mole, 1,200,000 grams per mole, 1,000,000 grams per mole, 900,000 grams per mole, 800,000 grams per mole, or 750,000 grams per mole. Thus, in the formulas $A[(OR^1)_xOR^2]_y$, and $H(OC_2H_4)_{x'}OH$, x, x', and "a+b" can be in a range from in a range from about 1000 to about 25000 in these embodiments.

The first and second poly(oxyalkylene) polymers can be present in a variety of useful ratios. A useful polymer processing additive composition can comprise a ratio of the first poly(oxyalkylene) polymer to the second poly(oxyalkylene) polymer in a range of 5:95 to 95:5. In some embodiments, the ratio of the first poly(oxyalkylene) polymer to the second poly(oxyalkylene) polymer in the polymer processing additive composition is from 1/2 to 2/1. The ratio may also be 1:1. When the weight average molecular weight of the first poly(oxyalkylene) polymer is greater than 500,000 grams per mole (e.g., up to about 1,500,000 grams per mole, 1,200,000 grams per mole, 1,000,000 grams per mole, 900,000 grams per mole, 800,000 grams per mole, or 750,000 grams per mole) a lower ratio (e.g., 1:3, 1:4, 1:5, or less) of the first poly(oxyalkylene) polymer to the second poly(oxyalkylene) polymer may be useful. In some embodiments, a polymer processing additive composition includes at least about 25, 40, or 50 percent by weight of the first poly(oxyalkylene) polymer based on the total weight of the polymer processing additive composition.

The metal salt of a carboxylic acid, sulfonic acid, or alkylsulfate may be useful for thermally stabilizing a poly(oxyalkylene) polymer (in some embodiments, the first poly(oxyalkylene) polymer) in compositions and methods according to the present disclosure. In some embodiments, the metal salt is a metal salt of a carboxylic acid or a sulfonic acid. Carboxylic acids and sulfonic acids may be monofunctional or multifunctional (e.g., difunctional) and may be aliphatic or aromatic. In other words, the carbonyl carbon or sulfonyl sulfur may be attached to an aliphatic group or aromatic ring. Aliphatic carboxylic acids and sulfonic acids may be saturated or unsaturated. In addition to the one or more —C(O)O⁻ or —S(O)$_2$O⁻ anions (i.e., carboxylate or sulfonate groups, respectively), the aliphatic or aromatic group may also be substituted by other functional groups including halogen (i.e., fluoro, chloro, bromo, and iodo), hydroxyl, and alkoxy groups, and aromatic rings may also be substituted by alkyl groups. In some embodiments, the carboxylic acid or sulfonic acid is monofunctional or difunctional and aliphatic, without any further substituents on the aliphatic chain.

In some embodiments, the metal salt is a metal salt of a carboxylic acid. In some embodiments, the carboxylic acid useful for providing the metal salt is represented by formula RCOOH, wherein R is alkyl or alkenyl. In some embodiments, the carboxylic acid is acetic acid. In some embodiments, the carboxylic acid is a fatty acid, for example, having an alkyl or alkenyl group with about 8 to 30 (in some embodiments, 8 to 26 or 8 to 22) carbon atoms. The common names of the fatty acids having from eight to twenty six carbon atoms are caprylic acid ($C_8$), capric acid ($C_{10}$), lauric acid ($C_{12}$), myristic acid ($C_{14}$), palmitic acid ($C_{16}$), stearic acid ($C_{18}$), arachidic acid ($C_{20}$), behenic acid ($C_{22}$), lignoceric acid ($C_{24}$), and cerotic acid ($C_{26}$). Fatty acid metal salts of these acids may be caprylate, caprate, laurate, myristate, palmitate, stearate, arachidate, behenate, lignocerate, and cerotate salts, in some embodiments. In some embodiments the carboxylic acid is other than stearic acid.

In some embodiments, the metal salt is a metal salt of a sulfonic acid. In some embodiments, the sulfonic acid useful for providing the metal salt is represented by formula RS(O)$_2$OH, wherein R is alkyl or alkenyl. The alkyl or alkenyl group has about 8 to 30 (in some embodiments, 8 to 26 or 8 to 22) carbon atoms.

In some embodiments, the metal salt is a metal salt of an alkyl sulfate. In addition to the one or more-OS(O)$_2$O— anions (i.e., sulfate groups), the alkyl group may also be substituted by other functional groups including halogen (i.e., fluoro, chloro, bromo, and iodo), hydroxyl, and alkoxy groups. In some embodiments, the alkyl group includes no further substitution. The acid useful for providing the metal salt is typically represented by formula R'OS(O)$_2$OH, wherein R' is alkyl having about 8 to 30 (in some embodiments, 8 to 26 or 8 to 22) carbon atoms.

Examples of useful metal cations in the metal salt of a carboxylic acid, sulfonic acid, or alkylsulfate include aluminum (Al), calcium (Ca), magnesium (Mg), zinc (Zn), barium (Ba), lithium (Li), sodium (Na), and potassium (K). In some embodiments, the metal salt is a sodium or potassium salt. In some embodiments, the metal salt is a zinc or calcium salt.

Many metal salts of a carboxylic acid, sulfonic acid, or alkylsulfate are available from a variety of commercial sources, and others can be made by conventional methods. In some embodiments, the metal salt of a carboxylic acid, sulfonic acid, or alkylsulfate can be formed in situ. In these embodiments, typically a first component containing the metal cation and a second component containing the carboxylic acid, sulfonic acid, or alkylsulfate can both be added to a polymer processing additive composition or a thermoplastic composition including an extrudable polymer (in some embodiments, polyolefin). For example, zinc oxide and stearic acid may be added to a composition to form zinc stearate.

Examples of metal salts of a carboxylic acid, sulfonic acid, or alkylsulfate useful for thermally stabilizing a poly(oxyalkylene) polymer in compositions and methods according to the present disclosure include calcium stearate, zinc stearate, barium stearate, aluminum stearate, potassium stearate, magnesium stearate, sodium stearate, zinc acetate, sodium acetate, sodium caprylate, sodium laurate, sodium behenate, sodium 1-decane sulfonate, sodium lauryl sulfate, and zinc phthalate. In some embodiments, the metal salt is other than calcium stearate or zinc stearate. In some embodiments, the metal salt is other than calcium stearate.

In a polymer processing additive composition useful for practicing the present disclosure comprising a first and optionally second poly(oxyalkylene) polymer and a metal salt of a carboxylic acid, sulfonic acid, or alkylsulfate, the first and optionally second poly(oxyalkylene) polymer can be present in an amount of at least 85% by weight, based on the total weight of the poly(oxyalkylene) polymer(s) and the metal salt. In some embodiments, the first and optionally second poly(oxyalkylene) polymer is present in an amount of at least 85%, 90%, 95%, or 97.5% by weight, based on the total weight of the poly(oxyalkylene) polymer and the metal salt. In some embodiments, metal salt is present in an amount of up to 15%, 10%, 5%, or 2.5% by weight based on the total weight of the poly(oxyalkylene) polymer and the metal salt. In some embodiments, the metal salt can improve the thermal stability of the first and optionally second poly(oxyalkylene) polymer even when it is present in amounts up to 1% or 0.5% by weight, based on the total weight of the poly(oxyalkylene) polymer(s) and the metal salt.

The data included in the Examples, below, clearly show that the addition of metal salts of carboxylic acids, sulfonic acids, or alkylsulfates to PEG increases the onset temperature of degradation as determined by a thermo-gravimetric analyzer (TGA). In some embodiments, the addition of metal salts of carboxylic acids, sulfonic acids, or alkylsulfates to a poly(oxyalkylene) polymer (e.g., PEG) increases the onset temperature of degradation of the poly(oxyalkylene) polymer by at least 20, 30, 40, 50, 60, 70, 80, 90, or 100 degrees as determined by TGA. The data also show that magnesium oxide does not offer as much stabilization as most of the metal salts of carboxylic acid, sulfonic acid, or alkylsulfate evaluated. However, combinations of metal oxides and metal salts of carboxylic acids, sulfonic acids, or alkylsulfates can be useful.

The poly(oxyalkylene) polymer stabilized with a metal salt of a carboxylic acid, sulfonic acid, or alkylsulfate is useful, for example, as a polymer processing additive. As shown in the Examples, below, the blend of a poly(oxyalkylene) polymer stabilized with a metal salt of a carboxylic acid, sulfonic acid, or alkylsulfate is effective for reducing the time to eliminate melt fracture during the extrusion of a film. Thus, the blend of a poly(oxyalkylene) polymer stabilized with a metal salt of a carboxylic acid, sulfonic acid, or alkylsulfate can be effective even in the absence of a fluoropolymer or a silicone-containing polymer. In some embodiments, the blend of a poly(oxyalkylene) polymer stabilized with a metal salt of a carboxylic acid, sulfonic acid, or alkylsulfate is comparable to fluoropolymers in reducing the time to eliminate melt fracture during the extrusion of a film. Thus, in some embodiments, the polymer processing additive composition comprising the poly(oxyalkylene) polymer stabilized with a metal salt of a carboxylic acid, sulfonic acid, or alkylsulfate is essentially free of fluoropolymers and silicones. "Essentially free of fluoropolymers and silicones" can refer to compositions including fluoropolymers and silicones but in an amount that may be ineffective for improving the melt fracture performance during an extrusion when the polymer processing additive composition is included in a host resin. In some embodiments, the polymer processing additive composition may include up to or less than 1, 0.5, 0.25, or 0.1 percent by weight of a fluoropolymer and/or silicone. Being "essentially free of fluoropolymers and silicones" can include being free of fluoropolymers and silicones.

In other embodiments, the stabilized first poly(oxyalkylene) polymer or blend of first and second poly(oxyalkylene) polymers can be used in combination with a silicone-containing polymer or fluoropolymer polymer processing additive. Fluoropolymers that are useful for at least partially alleviating melt defects in extrudable thermoplastic polymers and can be used in combination with the stabilized poly(oxyalkylene) polymer or poly(oxyalkylene) polymer blend include those described, for example, in U.S. Pat. Nos. 5,015,693 and 4,855,360 (Duchesne et al.), U.S. Pat. No. 5,710,217 (Blong et al.), U.S. Pat. No. 6,277,919 (Dillon et al.), U.S. Pat. No. 7,375,157 (Amos et al.), and U.S. Pat. Appl. Pub. No. 2010/0311906 (Lavallée et al.). Some fluoropolymers useful as polymer processing additives, which may be useful in combination with the stabilized poly(oxyalkylene) polymer or poly(oxyalkylene) polymer blend, are commercially available. For example, copolymers of hexafluoropropylene and vinylidene fluoride are commercially available from 3M Company, St. Paul, Minn., under the trade designations as "DYNAMAR FX 9613" and "DYNAMAR FX 9614", and copolymers of vinylidene fluoride, tetrafluoroethylene, and hexafluoropropylene are commercially available from 3M Company under the trade designations "DYNAMAR FX 5911", and "DYNAMAR FX 5912". Other useful fluoropolymers are commercially available from E.I. duPont de Nemours and Co., Wilmington, Del., under the trade designations "VITON A" and "VITON FREEFLOW" in various grades, from Daikin Industries, Ltd., Osaka, Japan, under the trade designation "DAI-EL" in various grades, and from Arkema, Colombes, France, under the trade designation "KYNAR" in various grades. Silicones that are useful for at least partially alleviating melt defects in extrudable thermoplastic polymers and can be used in combination with the stabilized poly(oxyalkylene) polymer or poly(oxyalkylene) polymer blend include polysiloxanes described, for example, in U.S. Pat. No. 4,535,113 (Foster et al.), polydiorganosiloxane polyamide block copolymers and polydiorganosiloxane polyoxamide block copolymers described, for example, in U.S. Pat. App. Pub. No. 2011-0244159 (Papp et al.), and silicone-polyurethane copolymers described, for example, in Int. Pat. Appl. Publ. No. WO2015/042415 (Lavallée et al.). Some silicone polymer processing additives are commercially available, for example, from Dow Corning, Midland, Mich., under the trade designation "DOW CORNING MB50-002" and Wacker Chemie AG, Munich, Germany, under the trade designation "GENIOPLAST".

A composition including a first and optionally second poly(oxyalkylene) polymer and a metal salt as described herein in any of its embodiments can be used in combination with other types of polymer processing additives or synergists such as silicone-polyether copolymers; aliphatic polyesters such as poly(butylene adipate), poly (lactic acid) and polycaprolactone polyesters; and aromatic polyesters such as phthalic acid diisobutyl ester. Blends of any of these classes of synergists may be useful. Also, block copolymers including blocks of two or more of these classes of synergists may be useful. For example, a silicone-polycaprolactone block copolymer or a poly(oxyalkylene)-polycaprolactone block copolymer may be useful in combination with the compositions disclosed herein.

Polymer processing additive compositions according to the present disclosure, which include a first poly(oxyalkylene) polymer, optionally a second poly(oxyalkylene) polymer, and a metal salt of a carboxylic acid, sulfonic acid, or alkylsulfate, may be used in the form of powders, pellets, granules of the desired particulate size or size distribution, or in any other extrudable form. These polymer processing additive compositions can contain conventional adjuvants such as antioxidants, hindered amine light stabilizers (HALS), UV stabilizers, metal oxides (e.g., magnesium oxide and zinc oxide), antiblocks (e.g., coated or uncoated), pigments, and fillers (e.g., titanium dioxide, carbon black, and silica).

HALS are typically compounds that can scavenge free-radicals, which can result from oxidative degradation. Some suitable HALS include a tetramethylpiperidine group, in which the nitrogen atoms on the piperidine may be unsubstituted or substituted by alkyl or acyl. Examples of suitable HALS include decanedioic acid, bis (2,2,6,6-tetramethyl-1-(octyloxy)-4-piperidinyl)ester, bis(2,2,6,6-tetramethyl-4-piperidyl)sebacate, 8-acetyl-3-dodecyl-7,7,9,9-tetramethyl-1,3,8-triazaspiro(4,5)-decane-2,5-dione, bis(2,2,6,6-tetramethyl-4-hydroxypiperidine succinate), and bis(N-methyl-2,2,6,6-tetramethyl-4-piperidyl)secacate. Suitable HALS further include those available, for example, from BASF, Florham Park, N.J., under the trade designations "CHIMASSORB". Examples of antioxidants include those obtained under the trade designations "IRGAFOS 168", "IRGANOX 1010" and "ULTRANOX 626", also available from BASF. These stabilizers, if present, can be included in the compositions according to the present disclosure in any effective amount, typically up to 5, 2, to 1 percent by weight based on the total weight of the polymer processing additive composition and typically at least 0.1, 0.2, or 0.3 percent by weight.

However, in some embodiments, the composition including a first poly(oxyalkylene) polymer, optionally a second poly(oxyalkylene) polymer, and a metal salt of a carboxylic acid, sulfonic acid, or alkylsulfate is surprisingly thermally stable even in the absence of conventional antioxidants. The ability metal salts of carboxylic acids, sulfonic acids, or alkylsulfates to enhance the thermal stability of poly(oxyalkylene) polymers were compared to various antioxidants as described in Tables 7 and 8 in the Examples, below. While the data show that a combination of antioxidant and stearate can outperform the individual components, stearate used alone can outperform conventional antioxidants. Accordingly, in some embodiments, the polymer processing additive composition including a first poly(oxyalkylene) polymer, optionally a second poly(oxyalkylene) polymer, and a metal salt of a carboxylic acid, sulfonic acid, or alkylsulfate is essentially free of antioxidants (e.g., hindered phenolic antioxidants). Essentially free of antioxidants (e.g., hindered phenolic antioxidants) can mean that the composition includes no antioxidant or includes an antioxidant in an amount of up to 0.1, 0.05, or 0.01 percent by weight, based on the total weight of the composition.

In some embodiments, a polymer processing additive composition disclosed herein including a first poly(oxyalkylene) polymer, optionally a second poly(oxyalkylene) polymer, and a metal salt of a carboxylic acid, sulfonic acid, or alkylsulfate, while useful as a polymer processing additive, can be provided separately from a host resin. Accordingly, in some embodiments, the polymer processing additive composition that includes a first poly(oxyalkylene) polymer having a weight average molecular weight of at least about 50,000 grams per mole, a second poly(oxyalkylene) polymer having a weight average molecular weight of up to about 20,000 grams per mole; and a metal salt of a carboxylic acid, sulfonic acid, or alkylsulfate is essentially free of polyolefins. Likewise, in some embodiments, a polymer processing additive that includes a first poly(oxyalkylene) polymer having a weight average molecular weight of at least about 50,000 grams per mole and a metal salt of a carboxylic acid, sulfonic acid, or alkylsulfate is essentially free of polyolefins. Essentially free of polyolefins can mean that the composition includes no polyolefin or includes a polyolefin in an amount of up to 1, 0.5, 0.1, or 0.05 percent by weight, based on the total weight of the polymer processing additive composition. In other embodiments, the polymer processing additive can be provided in a master batch in a host resin as described further below.

In some embodiments, a polymer processing additive composition disclosed herein including a first poly(oxyalkylene) polymer, optionally a second poly(oxyalkylene) polymer, and a metal salt of a carboxylic acid, sulfonic acid, or alkylsulfate is useful (e.g., as a polymer processing additive) in a thermoplastic composition including a thermoplastic, melt-processable polymer. A wide variety of thermoplastic polymers are melt-processable. Examples of useful thermoplastic polymers include hydrocarbon resins, polyamides (e.g., nylon 6, nylon 6/6, nylon 6/10, nylon 11 and nylon 12), polyester (e.g., poly (ethylene terephthalate) and poly (butylene terephthalate)), chlorinated polyethylene, polyvinyl resins (e.g., polyvinylchloride, polyacrylates and polymethylacrylates), polycarbonates, polyketones, polyureas, polyimides, polyurethanes, polyolefins and polystyrenes.

Useful melt-processable polymers have melt flow indexes (measured according to ASTM D1238 at 190° C., using a 2160-gram weight) of 5.0 grams per 10 minutes or less, or 2.0 grams per 10 minutes or less. Generally the melt flow indexes of melt-processable polymers are at least 0.1 or 0.2 grams per 10 minutes.

In some embodiments of the compositions and methods according to the present disclosure, useful melt-processable polymers are hydrocarbon polymers, for example, polyolefins. Examples of useful polyolefins include those having the general structure $CH_2=CHR^3$, wherein $R^3$ is a hydrogen or alkyl. In some embodiments, the alkyl radical includes up to 10 carbon atoms or from one to six carbon atoms. Melt-processable poleolefins include polyethylene, polypropylene, poly (1-butene), poly (3-methylbutene), poly (4-methylpentene), copolymers of ethylene with propylene, 1-butene, 1-hexene, 1-octene, 1-decene, 4-methyl-1-pentene, and 1-octadecene, blends of polyethylene and polypropylene, linear or branched low-density polyethylenes (e.g. those having a density of from 0.89 to 0.94 g/cm$^3$), high-density polyethylenes (e.g., those having a density of e.g. from 0.94 to about 0.98 g/cm$^3$), and polyethylene and olefin copolymers containing copolymerizable monomers (e. g., ethylene and acrylic acid copolymers; ethylene and methyl acrylate copolymers; ethylene and ethyl acrylate copolymers; ethylene and vinyl acetate copolymers; ethylene, acrylic acid, and ethyl acrylate copolymers; and ethylene, acrylic acid, and vinyl acetate copolymers). Melt-processable polymers include the metallic salts of the olefin copolymers, or blends thereof, that contain free carboxylic acid groups (e.g., polymers that include copolymerized acrylic acid). Illustrative of the metals that can be used to provide the salts of said carboxylic acids polymers are the one, two, and three valence metals such as sodium, lithium, potassium, calcium, magnesium, aluminum, barium, zinc, zirconium, beryllium, iron, nickel, and cobalt.

The polyolefins useful for practicing the present disclosure may be obtained by the homopolymerization or copolymerization of olefins. Useful polyolefins may be copolymers of one or more olefins and up to about 30 weight percent or more, in some embodiments, 20 weight percent or less, of one or more monomers that are copolymerizable with such olefins. Representative monomers that are copolymerizable with the olefins include: vinyl ester monomers such as vinyl acetate, vinyl propionate, vinyl butyrate, vinyl chloroacetate, and vinyl chloropropionate; acrylic and alpha-alkyl acrylic acid monomers and their alkyl esters, amides, and nitriles such as acrylic acid, methacrylic acid, ethacrylic acid, methyl acrylate, ethyl acrylate, N,N-dimethyl acrylamide, methacrylamide, and acrylonitrile; vinyl aryl monomers such as styrene, o-methoxystyrene, p-methoxystyrene, and vinyl naphthalene; vinyl and vinylidene halide monomers such as vinyl chloride, vinylidene chloride, and vinylidene bromide; alkyl ester monomers of maleic and fumaric acid and anhydrides thereof such as dimethyl maleate, diethyl maleate, and maleic anhydride; vinyl alkyl ether monomers such as vinyl methyl ether, vinyl ethyl ether, vinyl isobutyl ether, and 2-chloroethyl vinyl ether; vinyl pyridine monomers; N-vinyl carbazole monomers; and N-vinyl pyrolidine monomers.

In some embodiments, the polyolefin useful in the thermoplastic compositions and methods disclosed herein is prepared by Ziegler-Natta catalysis. In some embodiments, the polyolefin useful in the thermoplastic compositions and methods disclosed herein is prepared by homogeneous catalysis. In some embodiments, homogeneous catalysis refers to catalysis in which the catalyst and the substrate are in the same phase (e.g., in solution). In some embodiments, homogeneous catalysis refers to catalysis carried out by catalysts having a single active site. Single site catalysts typically contain a single metal center.

In some embodiments, the homogeneously catalyzed polyolefin is a metallocene-catalyzed polyolefin. Metallocene catalysts typically have one or two cyclopentadienyl anions complexed to a positively charged metal such as zirconium, titanium, or hafnium. It is understood that the cyclopentadienyl groups can be substituted (e.g., by an alkyl, phenyl, or silyl group) or fused to an aromatic ring such as benzene, and two cyclopentadienyl groups or one cyclopentadienyl group and another coordinating group (e.g., N-alkyl, P-alkyl, O, or S) can be connected together through a bridging group (e.g., $(CH_3)_2Si$, $(CH_3)_2C$, or $CH_2CH_2$). The metal can include other ligands such as halogen, hydrogen, alkyl, phenyl, or an additional cyclopentadienyl group. Metallocene catalysts are typically used in combination with methyl alumoxane or borates under homogeneous reaction conditions.

Commercially available metallocene-catalyzed polyolefins include those from Exxon Chemical Company, Baytown, Tex., under the trade designations "EXXPOL", "EXACT", "EXCEED", and "VISTAMAXX", and from Dow Chemical Company, Midland, Mich., under the trade designations "AFFINITY" and "ENGAGE".

Homogeneous or single-site catalysts other than metallocene catalysts are also useful for providing homogeneously catalyzed polyolefins. Such catalysts typically include at least one first ligand strongly bonded to a metal (e.g., zirconium, titanium, hafnium, palladium, or nickel) and at least one other ligand that may be labile. The first ligands typically remain bonded to the metal after activation (e.g., by methyl alumoxane or borate), stabilize the single form of the catalyst, do not interfere with polymerization, provide shape to the active site, and electronically modify the metal. Some useful first ligands include bulky, bidentate diimine ligands, salicylimine ligands, tridentate pyridine diimine ligands, hexamethyldisilazane, bulky phenolics, and acetylacetonate. Many of these ligands are described, for example, in Ittel et al., Chem. Rev., 2000, 100, 1169-1203. Other single site catalysts such as those described by Nova Chemicals Corporation, Calgary, Canada, under the trade designation "ADVANCED SCLAIRTECH TECHNOLOGY".

Homogeneously catalyzed polyolefins may have higher molecular weights, lower polydispersity, fewer extractables, and different stereochemistry than polyolefins made by other methods such as Ziegler-Nana catalysis. Homogeneous catalysis also allows for a broader selection of polymerizable monomers than Ziegler-Natta catalysis. Ziegler-Natta catalysis, which employs halogenated transition metal complexes mixed with organometallic compounds, can leave acidic residues in the resultant polyolefin resin. Acid-neutralizing additives such as calcium stearate and zinc stearate have been added to such resins. For homogeneously catalyzed polyolefins, such acidic residues are generally not present; therefore acid-neutralizing additives are not generally required.

Examples of useful homogeneously catalyzed polyolefins include those having the general structure $CH_2=CHR^{10}$, wherein $R^{10}$ is a hydrogen or alkyl. In some embodiments, alkyl includes up to 10 carbon atoms or from one to six carbon atoms. Homogeneously catalyzed polyolefins can include polyethylene, polypropylene, poly (1-butene), poly (3-methylbutene), poly (4-methylpentene), copolymers of ethylene with propylene, 1-butene, 1-hexene, 1-octene, 1-decene, 4-methyl-1-pentene, and 1-octadecene, blends of polyethylene and polypropylene, linear or branched low-density polyethylenes (e.g. those having a density of from 0.89 to 0.94 g/cm$^3$), and high-density polyethylenes (e.g., those having a density of e.g. from 0.94 to about 0.98 g/cm$^3$). In some embodiments, the homogeneously catalyzed polyolefin is linear low density polyethylene. In any of these embodiments, the homogeneously catalyzed polyolefin may be a metallocene-catalyzed polyolefin.

Thermoplastic compositions useful for practicing any of the embodiments of the present disclosure can contain any of the conventional adjuvants described above in any of their embodiments such as antioxidants, hindered amine light stabilizers (HALS), UV stabilizers, metal oxides (e.g., magnesium oxide and zinc oxide), antiblocks (e.g., coated or uncoated), pigments, and fillers (e.g., titanium dioxide, carbon black, and silica.

However, in some embodiments as described above, the polymer processing additive composition including a first poly(oxyalkylene) polymer, optionally a second poly(oxyalkylene) polymer, and a metal salt of a carboxylic acid, sulfonic acid, or alkylsulfate is surprisingly thermaly stable even in the absence of conventional antioxidants. Accordingly, in some embodiments, the thermoplastic composition including a polyolefin, a first poly(oxyalkylene) polymer, optionally a second poly(oxyalkylene) polymer, and a metal salt of a carboxylic acid, sulfonic acid, or alkylsulfate is essentially free of antioxidants (e.g., hindered phenolic antioxidants). Essentially free of antioxidants (e.g., hindered phenolic antioxidants) can mean that the composition includes no antioxidant or includes an antioxidant in an amount of up to 0.1, 0.05, 0.01, 0.005, or 0.002 percent by weight, based on the weight of the polyolefin. Furthermore, the polymer processing additive composition including a first poly(oxyalkylene) polymer, optionally a second poly(oxyalkylene) polymer, and a metal salt of a carboxylic acid, sulfonic acid, or alkylsulfate is effective for lowering the time to clear melt fracture during film extrusion even in the absence of inorganic anti-block agents (e.g., diatomaceous earth, calcium carbonate, silica, and talcs). Accordingly, in some embodiments, the composition including a polyolefin, a first poly(oxyalkylene) polymer, optionally a second poly(oxyalkylene) polymer, and a metal salt of a carboxylic acid, sulfonic acid, or alkylsulfate is essentially free of inorganic anti-block agents. Essentially free of inorganic anti-block agents (e.g., diatomaceous earth, calcium carbonate, silica, and talcs) can mean that the composition includes no inorganic anti-block agent or includes an inorganic anti-block agent in an amount of up to 1, 0.5, 0.1, 0.05, 0.01, 0.005, or 0.002 percent by weight, based on the total weight of the composition. Thus, the compositions disclosed herein can be considered surprisingly defect free upon extrusion, particularly in view of U.S. Pat. No. 4,540,538 (Corwin et al.), which requires the use of hindered phenolic anti-oxidants and inorganic anti-block agents to prevent gel streaking and pinstriping during the extrusion of Ziegler-Natta catalyzed olefin polymers.

In some embodiments, the thermoplastic polymer (in some embodiments, polyolefin), before it is combined with a polymer processing additive composition disclosed herein, is free of metal stearates. In some embodiments, the thermoplastic polymer (in some embodiments, polyolefin), before it is combined with a polymer processing additive composition disclosed herein, is free of any metal salt of a carboxylic acid, sulfonic acid, or alkylsulfate. As described above, acid-neutralizers are typically not necessary additives homogeneously catalyzed polyolefins.

The thermoplastic polymers may be used in the form of powders, pellets, granules, or in any other extrudable form. Compositions according to the present disclosure can be prepared by any of a variety of ways. For example, polymer processing additive compositions can be mixed with the thermoplastic polymers during the extrusion into polymer articles. They can also be provided as polymer compositions, so-called masterbatches, which may contain further components and/or one or more host thermoplastic polymers. A masterbatch can be a useful, diluted form of the polymer processing additive. Masterbatches can contain the first poly(oxyalkylene) polymer, optionally a second poly(oxyalkylene) polymer, and a metal salt of a carboxylic acid, sulfonic acid, or alkylsulfate dispersed in or blended with a host polymer, which can be a polyolefin, homogeneously catalyzed polyolefin, metallocene-catalyzed polyolefin, or any of the thermoplastics described above. Preparation of a masterbatch may allow for more accurate amounts of a polymer processing additive to be added to an extrudable composition, for example. The masterbatch may be a composition ready to be added to a thermoplastic polymer for being extruded into a polymer article. Masterbatches, which include concentrations of polymer processing additives as described below, are often prepared at relatively high temperatures under aerobic conditions.

Therefore, the thermal stability of first poly(oxyalkylene) polymer and optionally a second poly(oxyalkylene) polymer in the presence of the metal salt of a carboxylic acid, sulfonic acid, or alkylsulfate in the polymer processing additive compositions disclosed herein is useful for making masterbatches containing the polymer processing additive. The thermoplastic polymer (in some embodiments, polyolefin) to be extruded and the polymer processing additive composition can be combined together by any of the blending means usually employed in the plastics industry, such as with a compounding mill, a Banbury mixer, or a mixing extruder in which the polymer processing additive composition is uniformly distributed throughout the host thermoplastic polymer. The mixing operation is most conveniently carried out at a temperature above the melting point or softening point of the first poly(oxyalkylene) polymer although it is also possible to dry-blend the components in the solid state as particulates and then cause uniform distribution of the components by feeding the dry blend to a twin-screw melt extruder.

The resulting melt-blended mixture can be pelletized or otherwise comminuted into a desired particulate size or size distribution and fed to an extruder, which typically will be a single-screw extruder, that melt-processes the blended mixture. Melt-processing typically is performed at a temperature from 180° C. to 280° C., although optimum operating temperatures are selected depending upon the melting point, melt viscosity, and thermal stability of the blend. Different types of extruders that may be used to extrude the compositions of the present disclosure are described, for example, by Rauwendaal, C., "Polymer Extrusion", Hansen Publishers, p. 23-48, 1986. The die design of an extruder can vary, depending on the desired extrudate to be fabricated. For example, an annular die can be used to extrude tubing, useful in making fuel line hose, such as that described in U.S. Pat. No. 5,284,184 (Noone et al.).

Such compositions may be mixed with further thermoplastic polymer and/or further components to obtain a composition ready for processing into a polymer article. The composition may also contain all required ingredients and are ready for being extruded into a polymer article. The amount of polymer processing additive in these compositions is typically relatively low. Accordingly, the thermoplastic polymer (in some emboiments, polyolefin) is present in a major amount in the some embodiments of the composition according to the present disclosure. A major amount would be understood to be greater than 50 percent by weight of the composition. In some embodiments, the major amount is at least 60, 70, 75, 80, or 85 percent by weight of the composition. The exact amount used may be varied depending upon whether the extrudable composition is to be extruded into its final form (e. g., a film) or whether it is to be used as a masterbatch or processing additive which is to be (further) diluted with additional host polymer before being extruded into its final form.

Generally, a thermoplastic composition, which in some embodiments is a homogeneously catalyzed or metallocene-catalyzed polyolefin composition, includes the polymer processing additive disclosed herein in a combined weight of the first poly(oxyalkylene) polymer, optionally a second poly(oxyalkylene) polymer, and the metal salt of a carboxylic acid, sulfonic acid, or alkylsulfate in a range from about 0.002 to 50 weight percent (in some embodiments, 0.002 to 10 weight percent), based on the total weight of the thermoplastic composition. In some embodiments, the combined weight of the polymer processing additive composition components is in a range from 0.01 percent to 50 percent (in some embodiments, 0.01 to 10 weight percent), based on the total weight of the thermoplastic composition. In a masterbatch composition, the combined weight of the polymer processing additive composition components is in a range from 1 percent to 50 percent, in some embodiments, 1 percent to 10 percent, 1 percent to 5 percent, 2 percent to 10 percent, or 2 percent to 5 percent, based on the total weight of the composition. If the thermoplastic composition is to be extruded into final form and is not further diluted by the addition of host polymer, it typically contains a lower concentration of polymer processing additive composition. In some of these embodiments, the combined weight of the polymer processing additive composition components is in a range from about 0.002 to 2 weight percent, in some embodiments about 0.01 to 1 weight percent, or 0.01 to 0.2 weight percent, based on the total weight of the extrudable composition. The upper concentration of polymer processing additive used is generally determined by economic limitations rather than by any adverse physical effect of the concentration of the polymer processing additive.

In some embodiments, the composition including the thermoplastic polymer (in some embodiments, polyolefin), the first poly(oxyalkylene) polymer, optionally the second poly(oxyalkylene) polymer, and the metal salt of a carboxylic acid, sulfonic acid, or alkylsulfate is essentially free of fluoropolymers and silicones. "Essentially free of fluoropolymers and silicones" can refer to compositions including fluoropolymers and silicones but in an amount that may be ineffective for improving the melt fracture performance during an extrusion when the polymer processing additive composition is included in a host resin. In some embodiments, the composition may include up to or less than 100, 90, 80, 70, 60, 50, 40, 30, 20, or 10 ppm of a fluoropolymer and/or silicone. Being "essentially free of fluoropolymers and silicones" can include being free of fluoropolymers and silicones.

The polymer processing additive composition according to the present disclosure is useful in the extrusion of thermoplastic polymers (e.g., polyolefins), which includes for example, extrusion of films, extrusion blow molding, injection molding, pipe, wire and cable extrusion, and fiber production.

As described herein and demonstrated in the Examples, below, combinations of a poly(oxyalkylene) polymer (e.g., a polyethylene glycol) and a metal salt of a carboxylic acid, a sulfonic acid, or an alkylsulfate typically have significantly higher thermal stability than the poly(oxyalkylene) polymer alone. Improved thermal stability of the poly(oxyalkylene) polymer can allow polymer processing, including master batch processing and extrusion, at higher temperatures. Typically and advantageously, polymeric compositions that include combinations of a poly(oxyalkylene) polymer (e.g., a polyethylene glycol) and a metal salt of a carboxylic acid, a sulfonic acid can be processed at temperatures of at least 220° C., 230° C., 240° C., 250° C., 260° C., 270° C., 280° C., 290° C., or 300° C. or higher.

Some Embodiments of the Disclosure

In a first embodiment, the present disclosure provides a thermoplastic composition comprising:
 a polyolefin; and
 a polymer processing additive composition comprising:
  a first poly(oxyalkylene) polymer having a weight average molecular weight of at least about 50,000 grams per mole; and
  a metal salt of a carboxylic acid, sulfonic acid, or alkylsulfate. The polyolefin is typically present as a major component of the thermoplastic composition.

In a second embodiment, the present disclosure provides a method of reducing melt defects during extrusion of a polyolefin, the method comprising:
 combining a polyolefin, a polymer processing additive comprising a first poly(oxyalkylene) polymer having a weight average molecular weight of at least about 50,000 grams per mole and a metal salt of a carboxylic acid, sulfonic acid, or alkylsulfate to provide an extrudable composition; and
 extruding the extrudable composition.

In a third embodiment, the present disclosure provides a method of reducing melt defects during the extrusion of a thermoplastic polymer, the method comprising:
 providing a polymer processing additive composition comprising a first poly(oxyalkylene) polymer having a weight average molecular weight of at least about 50,000 grams per mole and a metal salt of a carboxylic acid, sulfonic acid, or alkylsulfate;
 providing an extrudable thermoplastic polymer;
 admixing the polymer processing additive composition and the extrudable polymer to provide an extrudable composition; and
 extruding the extrudable composition.

In a fourth embodiment, the present disclosure provides the method of the second or third embodiment, wherein when providing the extrudable polymer, the extrudable polymer is free of metal stearates.

In a fifth embodiment, the present disclosure provides the thermoplastic composition or method of any one of the first to fourth embodiments, wherein the extrudable polymer or polyolefin is a homogeneously catalyzed polyolefin or a metallocene-catalyzed polyolefin.

In a sixth embodiment, the present disclosure provides the thermoplastic composition or method of any one of the first to fifth embodiments, wherein the extrudable polymer or homogeneously catalyzed polyolefin is a linear low density polyethylene.

In a seventh embodiment, the present disclosure provides the thermoplastic composition or method of any one of the first to sixth embodiments, wherein the polymer processing additive composition is present in a range from 0.002 percent to 10 percent, based on the total weight of the composition or the extrudable composition.

In an eighth embodiment, the present disclosure provides the thermoplastic composition or method of any one of the first to seventh embodiments, wherein the metal salt is present at up to 15% by weight, based on the total weight of the polymer processing additive composition (that is, the poly(oxyalkylene) polymer and a metal salt of a carboxylic acid, sulfonic acid, or alkylsulfate).

In a ninth embodiment, the present disclosure provides the thermoplastic composition or method of any one of the first to eighth embodiments, wherein the weight average molecular weight of the first poly(oxyalkylene) polymer is up to about 500,000 grams per mole, 450,000 grams per mole, 400,000 grams per mole, 350,000 grams per mole, 300,000 grams per mole, or 250,000 grams per mole.

In a tenth embodiment, the present disclosure provides the thermoplastic composition or method of any one of the first to ninth embodiments, wherein the polymer processing additive further comprises a second poly(oxyalkylene) polymer having a weight average molecular weight of up to about 20,000 grams per mole.

In an eleventh embodiment, the present disclosure provides a polymer processing additive composition comprising:

a first poly(oxyalkylene) polymer having a weight average molecular weight of at least about 50,000 grams per mole;

a second poly(oxyalkylene) polymer having a weight average molecular weight of up to about 20,000 grams per mole; and a metal salt of a carboxylic acid, sulfonic acid, or alkylsulfate.

In a twelfth embodiment, the present disclosure provides the use of a composition comprising a first poly(oxyalkylene) polymer having a weight average molecular weight of at least about 50,000 grams per mole, a second poly(oxyalkylene) polymer having a weight average molecular weight of up to about 20,000 grams per mole, and a metal salt of a carboxylic acid, sulfonic acid, or alkylsulfate as a polymer processing additive composition.

In a thirteenth embodiment, the present disclosure provides the composition, method, or use of any one of the tenth to twelfth embodiments, wherein the weight average molecular weight of the first poly(oxyalkylene) polymer is up to about 1,500,000, 1,000,000 grams per mole, 900,000 grams per mole, 800,000 grams per mole, or 750,000 grams per mole.

In a fourteenth embodiment, the present disclosure provides the composition, method, or use of any one of the tenth to thirteenth embodiments, wherein the second poly(oxyalkylene) polymer is a polyethylene glycol.

In a fifteenth embodiment, the present disclosure provides the composition, method, or use of any one of the tenth to fourteenth embodiments, wherein the first poly(oxyalkylene) polymer and second poly(oxyalkylene) polymer are present in a weight ratio ranging from 5:95 to 95:5.

In a sixteenth embodiment, the present disclosure provides the composition, method, or use of any one of the first to fifteenth embodiments, wherein the composition further comprises polycaprolactone.

In a seventeenth embodiment, the present disclosure provides the composition, method, or use of any one of the first to sixteenth embodiments, wherein the composition is essentially free of fluoropolymers and silicones.

In an eighteenth embodiment, the present disclosure provides the composition, method, or use of any one of the first to seventeenth embodiments, wherein the weight average molecular weight of the first poly(oxyalkylene) polymer is at least about 60,000 grams per mole, 70,000 grams per mole, 75,000 grams per mole, 80,000 grams per mole, or 85,000 grams per mole.

In a nineteenth embodiment, the present disclosure provides the composition, method, or use of any one of the first to eighteenth embodiments, wherein the metal salt is a metal salt of a carboxylic acid or a sulfonic acid.

In a twentieth embodiment, the present disclosure provides the composition, method, or use of the nineteenth embodiment, wherein the metal salt is a metal salt of a carboxylic acid.

In a twenty-first embodiment, the present disclosure provides the composition, method, or use of the twentieth embodiment, wherein the metal salt is a metal salt of an aliphatic carboxylic acid.

In a twenty-second embodiment, the present disclosure provides the composition, method, or use of the twentieth or twenty-first embodiment, wherein the carboxylic acid is other than stearic acid.

In a twenty-third embodiment, the present disclosure provides the composition, method, or use of any one of the first to twenty-second embodiments, wherein the metal salt is a sodium or potassium salt.

In a twenty-fourth embodiment, the present disclosure provides the composition, method, or use of any one of the first to twenty-second embodiments, wherein the metal salt is a zinc or calcium salt.

In a twenty-fifth embodiment, the present disclosure provides the composition, method, or use of any one of the first to twenty-fourth embodiments, wherein the composition, the polymer processing additive composition, or the extrudable composition further comprises at least one of an antioxidant or a hindered amine light stabilizer.

In a twenty-sixth embodiment, the present disclosure provides the composition, method, or use of any one of the first to twenty-fourth embodiments, wherein the composition, the polymer processing additive composition, or the extrudable composition is essentially free of antioxidants.

In a twenty-seventh embodiment, the present disclosure provides the composition, method, or use of any one of the first to twenty-sixth embodiments, wherein the composition, the polymer processing additive composition, or the extrudable composition further comprises a metal oxide.

In a twenty-eighth embodiment, the present disclosure provides the composition, method, or use of any one of the first to twenty-seventh embodiments, wherein the first poly(oxyalkylene) polymer is a polyethylene glycol.

In a twenty-ninth embodiment, the present disclosure provides a polymer processing additive comprising a first poly(oxyalkylene) polymer having a weight average molecular weight of at least about 50,000 grams per mole and a metal salt of a carboxylic acid, sulfonic acid, or alkylsulfate, wherein the polymer processing additive is essentially free of fluoropolymers, silicones, and polyolefins.

In a thirtieth embodiment, the present disclosure provides the use of a poly(oxyalkylene) having a weight average molecular weight of at least about 50,000 grams per mole polymer and a metal salt of a carboxylic acid, sulfonic acid, or alkylsulfate as a polymer processing additive.

In a thirty-first embodiment, the present disclosure provides the polymer processing additive or use of the twenty-ninth or thirtieth embodiment, wherein the metal salt is present at up to 15% by weight, based on the total weight of the polymer processing additive.

In a thirty-second embodiment, the present disclosure provides the polymer processing additive or use of any one of the twenty-ninth to thirty-first embodiments, wherein the metal salt is a metal salt of a carboxylic acid or a sulfonic acid.

In a thirty-third embodiment, the present disclosure provides the polymer processing additive or use of the thirty-second embodiment, wherein the metal salt is a metal salt of a carboxylic acid.

In a thirty-fourth embodiment, the present disclosure provides the polymer processing additive or use of the thirty-third embodiment, wherein the metal salt is a metal salt of an aliphatic carboxylic acid.

In a thirty-fifth embodiment, the present disclosure provides the polymer processing additive or use of the thirty-second or thirty-third embodiment, wherein the carboxylic acid is other than stearic acid.

In a thirty-sixth embodiment, the present disclosure provides the polymer processing additive or use of any one of the twenty-ninth to thirty-fifth embodiments, wherein the metal salt is a sodium or potassium salt.

In a thirty-seventh embodiment, the present disclosure provides the polymer processing additive or use of any one of the twenty-ninth to thirty-fifth embodiments, wherein the metal salt is a zinc or calcium salt.

In a thirty-eighth embodiment, the present disclosure provides the polymer processing additive or use of any one of the twenty-ninth to thirty-seventh embodiments, further comprising at least one of an antioxidant or a hindered amine light stabilizer.

In a thirty-ninth embodiment, the present disclosure provides the polymer processing additive or use of any one of the twenty-ninth to thirty-seventh embodiments, wherein the polymer processing additive is essentially free of antioxidant.

In a fortieth embodiment, the present disclosure provides the polymer processing additive or use of any one of the twenty-ninth to thirty-ninth embodiments, further comprising a metal oxide.

In a forty-first embodiment, the present disclosure provides the polymer processing additive or use of any one of the twenty-ninth to fortieth embodiments, wherein the poly(oxyalkylene) polymer is a polyethylene glycol.

In order that this disclosure can be more fully understood, the following examples are set forth. It should be understood that these examples are for illustrative purposes only and are not to be construed as limiting this disclosure in any manner.

EXAMPLES

In these examples, all amounts are expressed in parts by weight. Abbreviations include g=grams, min=minutes, hrs=hours, rpm=revolutions per minute, wt=weight, EX=example, CE=comparative example, HALS=hindered amine light stabilizers, TGA=thermo gravimetric analysis. PEG=polyethylene glycol, Me=methyl, MW=molecular weight, PPA=polymer processing additive, MF=melt fracture, MB=master batch, MI=melt index in grams per ten minutes, LLDPE=linear low density polyethylene, AO=antioxidant.

Materials

| Acronym | Description | TGA Onset (neat) (° C.) |
|---|---|---|
| "FX-9613" | A partially fluorinated fluoroelastomer (FKM) processing aid commercially available from 3M Company, St. Paul, MN, USA under the trade name "3M DYNAMAR POLYMER PROCESSING ADDITIVE FX-9613" | — |
| "FC-5911" | A partially fluorinated fluoroelastomer commercially available from 3M Company under the trade name "3M DYNAMAR POLYMER PROCESSING ADDITIVE FX-5911" | |
| LLDPE 2.0 | 2.0 MI Ziegler-Natta LLDPE available as "EXXONMOBIL LLDPE LL 1002.09" from Exxon Mobil, Irving, Tx, as a granular resin | |
| LLDPE 0.9 | 0.9 MI Ziegler-Natta LLDPE available as "MARFLEX 7109" from Chevron Phillips Chemical Co. LP, The Woodlands, TX | |
| PEG 8K | Poly(Ethylene Glycol), 8000 MW obtained from Dow Chemical Company, Midland, Mich. | 205 |
| PEG 20K | Poly(Ethylene Glycol), 20,000 MW obtained from Alfa Aesar, Ward Hill, MA | |
| PEG 100K | Poly(Ethylene Glycol), 100,000 MW obtained from Acros Organics, NJ | |
| PEG 200K | Poly(Ethylene Glycol), 200,000 MW obtained from Acros Organics | |
| PEG 300K | Poly(Ethylene Glycol), 300,000 MW obtained from Acros Organics | |
| PEG 600K | Poly(Ethylene Glycol), 600,000 MW obtained from Janssen Chemica, Geel, BE (now Acros Organics) | |
| "B225" | Blend of "IRGAFOS 168" (trisarylphosphite antioxidant) and "IRGANOX 1010" (sterically hindered phenolic antioxidant) available from BASF, Florham Park, NJ, under the trade name "IRGANOX B225" | 268 |
| "B900" | Blend of "IRGAFOS 168" and "IRGANOX 1076" (sterically hindered phenolic antioxidant) available from BASF under the trade name "IRGANOX B 900" | |
| "1010" | Sterically hindered phenolic antioxidant available from BASF under the trade name "IRGANOX 1010" | 323 |
| "1076" | Sterically hindered phenolic antioxidant available from BASF under the trade name "IRGANOX 1076" | 273 |
| "168" | Trisarylphosphite antioxidant available from BASF under the trade name "IRGAFOS 168" | 265 |
| HALS | Hindered amine light stabilizer (HALS) antioxidant available from BASF under the trade name "CHIMASSORB 944" | 324 |
| MgO | Magnesium Oxide available as "MAGLITE Y" from Hallstar Co., Chicago, IL | |
| ZnO | Zinc Oxide available as "AZO77HSA" from US Zinc, Houston, TX | |
| Stearic Acid | Available from EMD Chemicals, Philadelphia, PA | 204 |
| Al Stearate | Available as "MATHE ALUMINUM STEARATE NO. 9" from Norac Additives, Helena, AR | 225 |

-continued

| Acronym | Description | TGA Onset (neat) (° C.) |
|---|---|---|
| Ba Stearate | TCI America, Portland, OR | 253 |
| Ca Stearate | Baerlocher Cleveland, OH | 390 |
| K Stearate | Available as "MATHE POTASSIUM STEARATE" Norac Additives, Helena, AR | 338 |
| Mg Stearate | Norac Additives, Helena, AR | 309 |
| Na Stearate | Available as "MATHE SODIUM STEARATE" Norac Additives, Helena, AR | 328 |
| Zn Stearate | Alfa Aesar, Ward Hill, MA | 285 |
| Zn Acetate | Zinc Acetate dihydrate available from J. T. Baker Chemical Co, Phillipsburg, NJ | — |
| Na Acetate | Alfa Aesar, Ward Hill, MA | — |
| Na Caprylate | Sodium caprylate available from Nu-Chek Prep, Elysian, MN | — |
| Na Laurate | Sodium laurate available from Nu-Chek Prep, Elysian, MN | — |
| Na Behenate | Sodium behenate available from Nu-Chek Prep, Elysian, MN | — |
| Mono Na C12 Phosphate | Sodium Monododecyl Phosphate, Sigma Aldrich, St. Louis, MO | — |
| Mono/Di Mix Na C12 Phospahte | Sodium Monododecyl Phosphate (mixture of mono and di salt) available from TCI America, Portland, OR | — |
| Na C10 Sulfonate | Sodium 1-Decane Sulfonate, Alfa Aesar, Ward Hill, MA | — |
| Na Lauryl Sulfate | Sodium Lauryl Sulfate available from Alfa Aesar, Ward Hill, MA | — |
| Na Phthalate | Disodium phthalate (Bioscience Inc, , Allentown, PA) | |
| Zn Phthalate | Prepared by dissolving 2.1 g of disodium phthalate (Bioscience) in 20 ml of deionized water. 4.2 g of ZnNO$_3$ (Integra) was dissolved in 30 ml of deionized water. The 2 solutions were mixed together and allowed to crystallize overnight. The suspension was filtered using a Buchner funnel and rinsed with deionized water. The solids were placed to dry in an oven at 110° C. for 2 hr (yield 0.5 g). | |

Weight Average Molecular Weight Determination

The weight average molecular weights of PEG 8K, 20K, 100K, 200K, 300K, and 600K samples were determined by comparison to Narrow distribution poly(ethylene oxide) standards using gel permeation chromatography (GPC). The GPC measurements were carried out on an Agilent 1100 instrument (obtained from Agilent Technologies, Santa Clara, Calif.) using an Agilent Plgel Mixed-C 5 µ30 cm×7.5 mm column (obtained from Agilent Technologies) for the 8K, 20K, 100K, 200K, and 300K samples and an Agilent Plgel Mixed-A 20µ, 30 cm×7.5 mm column (obtained from Agilent Technologies) for the 600K sample. A refractive index detector was used at 40° C. Solutions were made of the PEG samples at 25 mg per 20 mL of 1:1 stabilized tetrahydrofuran/chloroform. Samples were swirled overnight to ensure complete solution. They were not filtered before analysis to avoid any possible contamination from the filter. A sample volume of 50 microliters was injected onto the column for the 8K, 20K, 100K, 200K, and 300K samples, and the column temperature was 40° C. Sample volumes of 25 microliters and 50 microliters were injected onto the column for the 600K sample. A flow rate of 0.6 mL/minute was used, and the mobile phase was 1:1 stabilized tetrahydrofuran/chloroform. Molecular weight calibration was performed using narrow distribution poly(ethylene oxide) standards from Agilent Technologies, which were dissolved in 1:1 stabilized THF/chloroform at about 5-10 mg per 20 mL solvent. These covered a molecular weight range of 1.7 MDa down to 600 Da.. Calibration and molecular weight distribution calculations were performed using suitable GPC software using a third order polynomial fit for the molecular weight calibration curve. Each reported result is an average of duplicate injections except for the 600K sample, which is the average of two 25 microliter and two 50 microliter injections. The results are shown in Table 1, below, in which Mp=Molecular weight at signal peak, Mn=Number-average molecular weight, Mw=Weight-average molecular weight, and Ð=Dispersity=Mw/Mn.

TABLE 1

| Sample Name | Nominal M | Mp | Mn | Mw | Ð |
|---|---|---|---|---|---|
| PEO 8K | 8,000 | 8,750 | 7,910 | 8,360 | 1.06 |
| PEO 20K | 20,000 | 19,800 | 16,800 | 18,400 | 1.1 |
| PEO 100K | 100,000 | 59,200 | 23,900 | 131,000 | 5.5 |
| PEO 200K | 200,000 | 80,000 | 28,000 | 280,000 | 10 |
| PEO 300K | 300,000 | 360,000 | 61,000 | 700,000 | 11.6 |
| PEO 600K | 600,000 | 700,000 | 100,000 | 1,200,000 | 11 |

Melt Viscosity Determination

The melt viscosity of the PEG samples was characterized by rheology, as melt viscosity can also be indicative of differences in Mw, MWD, and structure changes. This test protocol allows building a viscosity master-curve at a reference temperature, and provides the fit parameters for a Carreau-Yassuda-Arrhenius equation.

The melt viscosity was measured using an AR2000ex parallel plate rheometer from TA instruments. It was fitted with Ni plated 25 mm disposable plates mounted on an electrically heated plates system (EHP). The materials were pressed into a bubble free 1.25 mm sheet at 130° C. For each material, a 30 mm disc was cut out and placed between the rheometer plates at 150° C. The gap was set at 1.1 mm and the sample was trimmed after the normal force stabilized. The gap was then set to 1.0 mm and the measurement was initialized after the normal force stabilized. The procedure was a time and frequency sweep, with five points per decade, at frequencies ranging from 0.1 to 398.1 rad/s, and at six temperatures, ranging from 150° C. to 250° C., and a strain of 10%. A Cole-Cole Plot and a Van Gurp-Palmen Plot were used to verify the data consistency. Any scatter in the dataset on those plots is indicative of improper test conditions, multiple phases/responses, or of changing structure during the test (long chain branching, crystallinity, degradation, foaming, etc). Any inconsistent data was rejected from the analysis. The η' and η* data was fitted simultaneously to the combined Carreau-Yasuda model and Arrhenius equation (Equations used in U.S. Pat. No. 5,710,217 to fit re alone), using the Solver add-in in Excel. The only parameter that was changed is the test temperatures for PEG 20K, as its viscosity was too low to test under the standard conditions. In this case the temperatures were from 90 to 190° C., with 20° C. increments. Results are shown in Table 2, below.

TABLE 2

| | Mw Dalton | Log (Eta Zero) Pa · s | Eta* @ 1 rad/s Pa · s | Eta' @ 1 rad/s Pa · s |
|---|---|---|---|---|
| PEG 600K | 1,200,000 | 6.178854 | 168800 | 108900 |
| PEG 300K | 700,000 | 5.587039 | 47950 | 36100 |
| PEG 200K | 280,000 | 3.97157 | 4393 | 4066 |
| PEG 100K | 131,000 | 3.745439 | 1832 | 1691 |
| PEG 20K | 18,400 | 0.362003 | 2.252 | 2.252 |

Thermal Stability

The thermal stability was measured using a Perkin Elmer Pyris 1 Thermo-Gravimetric Analyzer (TGA), with a heating rate of 10° C./min under air, with a gas flow of 20 cc/min. The temperature was ramped from approximately 30° C. to 750° C. The sample size varied between approximately 5 mg and 20 mg. The decomposition onset was obtained from the Perkin Elmer software (V. 10.1.0.0412) using the two points at 50° C. and 90% weight loss to draw two tangent lines. The intercept between those lines is reported as the onset of decomposition.

Powder blends for thermal stability evaluation were prepared using a mortar and pestle, by mixing the relative amounts of each component to obtain 2 to 10 g batches. Some blends were prepared by successive dilution. All proportions are indicated as weight percent (wt %).

Because the decomposition onset temperature is affected by the sample weight, the onset was measured for 6 neat PEG samples with weights between 4 and 26 mg (Table 1 below). A second order equation was fitted to the data with an $R^2$ of 0.995. Using this regression, the expected onset for each sample of the examples was obtained based on their weight. The difference between the measured onset and expected onset was then calculated and results shown in Tables 5, 7 and 8.

Example PEG decomposition onset temperatures for various stearate salts and mixtures with oxides are reported in Table 4. The 100% column reports the onset for the pure stearate salts. Table 3 shows a temperature of 189° C. to 264° C. for pure PEG 8000 (0% additive). Table 5 shows the difference between the measured and expected onset of degradation for the same blends. When blends were used, the concentration refers to the total level of additive in PEG.

TABLE 3

PEG 8K Decomposition Onset (° C.) by TGA for varying weight samples

| Sample Weight (mg) | Measured Onset (° C.) |
|---|---|
| 4.319 | 190 |
| 6.442 | 201 |
| 10.932 | 228 |
| 15.871 | 242 |
| 18.265 | 248 |
| 26.585 | 264 |

TABLE 4

PEG 8K Decomposition Onset (° C.) by TGA

| | Additive (wt % in PEG) | | | | | | | |
|---|---|---|---|---|---|---|---|---|
| | 0.2 | 0.5 | 1 | 2.5 | 5 | 10 | 15 | 100 |
| Stearic Acid | | | | | 255 | | | 204 |
| Ca Stearate | 279 | | | | 341 | | | 390 |
| Ba Stearate | | | | 298 | 327 | 282 | 279 | 253 |
| K Stearate | | | | | 341 | 321 | 272 | 305 | 338 |
| Zn Stearate | | 304 | 315 | 329 | 338 | 319 | 283 | 285 |
| 1:1 Ba Stearate/ K Stearate | | | | | | 309 | | 327 |
| 1:1 Zn Stearate/ Ba Stearate | | | | | | 303 | | 306 |
| 1:1 Zn Stearate/ K Stearate | | | | | 322 | 333 | 323 | 307 |
| MgO | 253 | | | | 258 | | | *NM |
| ZnO | 258 | | | | 274 | | | NM |
| 1:1 ZnO/ Zn Stearate | | | | | | 337 | | NM |

*NM = not measured

TABLE 5

PEG Decomposition Onset Difference (° C.) by TGA

| | Additive (wt % in PEG) | | | | | | |
|---|---|---|---|---|---|---|---|
| | 0.2 | 0.5 | 1 | 2.5 | 5 | 10 | 15 |
| Stearic Acid | | | | | −6 | | |
| Ca Stearate | 15 | | | | 80 | | |
| Ba Stearate | | | | 68 | 77 | 82 | 80 |
| K Stearate | | | | | 83 | 84 | 71 | 101 |
| Zn Stearate | | 46 | 59 | 83 | 108 | 112 | 85 |
| 1:1 Ba Stearate/K Stearate | | | | | | 103 | |
| 1:1 Zn Stearate/Ba Stearate | | | | | | 99 | |
| 1:1 Zn Stearate/K Stearate | | | | | 118 | 123 | 111 |
| MgO | 13 | | | | 28 | | |
| ZnO | 11 | | | | 16 | | |
| 1:1 ZnO/Zn Stearate | | | | | | 88 | |

TABLE 6

PEG 600K Decomposition Onset (° C.) by TGA

| Sample | Sample Weight (mg) | Decomposition Onset (° C.) |
|---|---|---|
| PEG 600K | 8.99 | 231 |
| PEG 600K + Zn Stearate (95:5) | 8.62 | 327 |

The stearates were also compared to various antioxidants and their blends with stearates (Tables 7 and 8). The concentration refers to the total amount of additive.

TABLE 7

PEG Decomposition Onset (° C.) by TGA

| Additive (wt % in PEG) | 2.5 | 5 | 10 | 100 |
|---|---|---|---|---|
| "1010" | | 311 | | 323 |
| "1076" | | 308 | | 273 |
| "168" | | 242 | | 265 |
| "B225" | 304 | 289 | | 268 |
| Zn Stearate | 329 | 338 | 319 | 285 |
| 1:1 Zn Stearate/"1010" | | 361 | | |

TABLE 7-continued

PEG Decomposition Onset (° C.) by TGA

| Additive (wt % in PEG) | 2.5 | 5 | 10 | 100 |
|---|---|---|---|---|
| 1:1 Zn Stearate/"1076" | | 337 | 350 | |
| 1:1 Zn Stearate/"168" | | 337 | 307 | |
| 1:1 Zn Stearate/"B225" | | 345 | 333 | |
| K Stearate | 341 | 321 | 272 | 338 |
| 1:1 K Stearate/"1010" | | 315 | | |
| 1:1 K Stearate/"168" | | 350 | | |
| 1:1 K Stearate/"B225" | | 269 | | |
| Ba Stearate | 298 | 327 | 282 | 253 |
| 1:1 Ba Stearate/"1076" | | 326 | 334 | |
| 1:1 Ba Stearate/"B225" | | 334 | 330 | |
| HALS | | 261 | | 324 |
| 1:1 Zn Stearate/HALS | | 360 | | |
| 2.5 Zn Stearate + 2.5 Ba Stearate + 5.0 HALS | | | 309 | |

TABLE 8

PEG Decomposition Onset Difference (° C.) by TGA, for Various Antioxidant Blends

| Additive (wt % in PEG) | 2.5 | 5 | 10 |
|---|---|---|---|
| "1010" | | 114 | |
| "1076" | | 49 | |
| "168" | | 47 | |
| "B225" | 75 | 93 | |
| Zn Stearate | 83 | 108 | 112 |
| 1:1 Zn Stearate/"1010" | | 101 | |
| 1:1 Zn Stearate/"1076" | | 104 | 108 |
| 1:1 Zn Stearate/"168" | | 76 | 67 |
| 1:1 Zn Stearate/"B225" | | 113 | 113 |
| K Stearate | 83 | 84 | 68 |
| 1:1 K Stearate/"1010" | | 122 | |
| 1:1 K Stearate/"168" | | 88 | |
| 1:1 K Stearate/"B225" | | 63 | |
| Ba Stearate | 68 | 88/77[a] | 77 |
| 1:1 Ba Stearate/"1076" | | 67 | 84 |
| 1:1 Ba Stearate/"B225" | | 79 | 115/72[a] |
| HALS | | 69 | |
| 1:1 Zn Stearate/HALS | | 107 | |
| 2.5 Zn Stearate + 2.5 Ba Stearate + 5.0 HALS | | | 101 |

[a]Measurement was repeated

Metal salts of various carboxylic acids, sulfonic acids, and alkyl sulfates were also evaluated by TGA. The "Thermal Stability" method described above was used with the modification that the sample size varied from 16 mg to 20 mg. Each salt was blended at 5% by weight in PEG. The data is reported in Table 9, below.

TABLE 9

PEG Decomposition Onset and Onset Difference (° C.) by TGA, for Various Salt Additives

| Salt | Measured Onset (° C.) | Difference (° C.) |
|---|---|---|
| Zn Acetate | 281 | 47 |
| Na Acetate | 243 | 5 |
| Na Caprylate | 360 | 106 |
| Na Laurate | 354 | 100 |
| Na Stearate | 318 | 73 |
| Na Benehate | 321 | 67 |
| Mono Na C12 Phosphate | 211 | −19 |
| Mono/Di Mix Na C12 Phosphate | 208 | −5 |
| Na Capryl Sulfonate | 288 | 50 |
| Na Lauryl Sulphate | 229 | 3 |

TABLE 9-continued

PEG Decomposition Onset and Onset Difference (° C.) by TGA, for Various Salt Additives

| Salt | Measured Onset (° C.) | Difference (° C.) |
|---|---|---|
| Disodium Phthalate | 247 | 0 |
| Zn Phthalate | 242 | 3 |

For comparison, end capped PEG's were also evaluated by TGA with and without zinc stearate. Zinc stearate was evaluated at 2.5% and 5% by weight the PEG. The "Thermal Stability" method described above was used with the modification that the sample size varied from 4 mg to 26 mg. The data is reported in Table 10, below. As shown in Table 10, an ether or ester-linked end cap on the PEG improves thermal stability, but to a lesser extent than the addition of a stearate, suggesting that the improvement is not simply related to the esterification of the chain ends by the stearate salt.

TABLE 10

PEG Decomposition Onset by TGA

| PEG Type | TGA Onset (° C.) |
|---|---|
| PEG 2000 | 210 |
| Me-PEG 2000 | 241 |
| $C_{18}$-PEG-$C_{18}$ | 236 |
| 97.5 $C_{18}$-PEG-$C_{18}$/2.5 Zn Stearate | 270 |
| 95 $C_{18}$-PEG-$C_{18}$/5 Zn Stearate | 300 |

Examples 1 to 6 and Illustrative Examples A to D

For Examples 1 to 6 and Illustrative Examples A and B, master batches (MB) were prepared in 2 kg batches by shaking vigorously in a bag 1940 g of LLDPE 2.0, 2.0 g of "B900" antioxidant, 3.0 g of Zn Stearate, and 57 g of the PEG samples shown in Table 11, below. For Examples 5 and 6, 28.5 g of each of the first poly(oxyalkylene) and the second poly(oxyalkylene) were used. For Example 4, 54.3 g of PEG, 3 g of Zn Stearate, 1.2 g of MgO, and 1.5 g of "B225" were used. For Illustrative Example A, 60 g of PEG and no Zn Stearate was used. The mixture was fed to a laboratory scale, intermeshing, counter rotating, unvented, air cooled, conical twin screw (HaakeBuchler Rheomix TW-100) with a front inside diameter of 20 mm. The mixture was gravity fed to the throat of the extruder, exposed to air at a rate of 35 to 40 g/min. The extruder specific temperature profile of the 3 barrel zones (feed, metering, mixing), and die zone was 170° C./190° C./200° C./200° C. respectively. The extruder was run at 150 RPM for the first "compounding" pass. The 2nd pass was run with the same temperature profile but at 90 RPM while flood feeding the material. A 4 minute "purge" of material was discarded at the beginning each pass.

The melt fracture performance was evaluated using LLDPE 0.9 as the host resin. Examples 8 to 11 were made using a blown film line from Reifenhäuser Kiefel, Sankt Augustin, Germany, with a 40 mm, 24/1, grooved feed extruder. The die was of spiral design with a 40-mm diameter and 0.9-mm die gap (36 mil).

A "time to clear melt fracture" evaluation was done by diluting the MB to a target level of 300 ppm in the host resin at 210° C. (410° F.), 0.9 mm (36 mil) gap, 14 L/D, 10.5 kg/h (23 lb/h), and 220/s. After an hour of running at 300 ppm, the level was increased by 300 ppm every subsequent hour up to 1200 ppm. The pressure was recorded every 10 minutes and a sample of film was collected. The film was examined for the presence of melt fracture, and the time corresponding to the disappearance of the last band of melt fracture or time to clear melt fracture was recorded (TTC). In some cases, the time required to eliminate melt fracture extended beyond the timeframe of the test. Therefore, to allow comparison, the data was fitted using a cumulative Gaussian and the time to reach 50% melt fracture (half time—$T_{1/2}$) was reported. The $T_{1/2}$ value is an indicator of the rate of MF elimination. The results are shown in Table 11, below.

For Illustrative Examples C and D, 60 g of "3M DYNAMAR POLYMER PROCESSING ADDITIVE FX-9613" and 60 g of "3M DYNAMAR POLYMER PROCESSING ADDITIVE FX-5911", respectively, were used in place of the PEG and Zn Stearate. The time to clear melt fracture for Illustrative Example C was 100 minutes with a $T_{1/2}$ value of 42 minutes. The time to clear melt fracture for Illustrative Example D was 140 minutes with a $T_{1/2}$ value of 64 minutes.

TABLE 11

Time to Clear Melt Fracture in Film at 230° C. (450° F.)

| Example | First Poly(oxy-alkylene) | Second Poly(oxy-alkylene) | Time to Clear Melt Fracture (minutes) | $T_{1/2}$ (minutes) |
|---|---|---|---|---|
| 1 | PEG 100K | | 220 | 88 |
| 2 | PEG 200K | | 210 | 93 |
| 3 | PEG 300K | | 230 | 135 |
| 4 | PEG 600K | | 10% @ 240 | 210 |
| 5 | PEG 600K | PEG 8K | 180 | 101 |
| 6 | PEG 100K | PEG 8K | 140 | 69 |
| Ill. Ex. A | | PEG 8K | 0.5% @ 240 | 128 |
| Ill. Ex. B | | PEG 20K | 170 | 102 |

Various modifications and alterations of this disclosure may be made by those skilled the art without departing from the scope and spirit of the disclosure, and it should be understood that the claimed invention is not to be unduly limited to the illustrative embodiments set forth herein.

What is claimed is:

1. A thermoplastic composition comprising:
   a polyolefin; and
   a polymer processing additive composition comprising:
      a first poly(oxyalkylene) polymer having a weight average molecular weight of at least 60,000 grams per mole;
      a second poly(oxyalkylene) polymer having a weight average molecular weight of up to 15,000 grams per mole; and
      a metal salt of a carboxylic acid, sulfonic acid, or alkylsulfate, wherein the first poly(oxyalkylene) polymer and the second poly(oxyalkylene) polymer are present in a weight ratio ranging from 1:3 to 2:1, and wherein the thermoplastic composition is free of fluoropolymers and silicones.

2. The thermoplastic composition of claim 1, wherein the weight average molecular weight of the first poly(oxyalkylene) polymer is up to about 500,000 grams per mole.

3. The thermoplastic composition of claim 1, wherein the weight average molecular weight of the first poly(oxyalkylene) polymer is up to about 1,000,000 grams per mole.

4. The thermoplastic composition of claim 1, wherein the metal salt is a metal salt of a carboxylic acid.

5. The thermoplastic composition of claim 1, further comprising at least one of an antioxidant, a metal oxide, or a hindered amine light stabilizer.

6. The thermoplastic composition of claim 1, wherein the first poly(oxyalkylene) polymer is a polyethylene glycol.

7. The thermoplastic composition of claim 1, wherein the polyolefin is a linear low density polyethylene.

8. The thermoplastic composition of claim 1, wherein the polyolefin is a homogeneously catalyzed polyolefin.

9. A method of reducing melt defects during extrusion of the polyolefin, the method comprising extruding the thermoplastic composition of claim 1.

10. The method of claim 9, further comprising:
    admixing the polymer processing additive composition and the polyolefin to provide the thermoplastic composition before extruding the thermoplastic composition.

11. The thermoplastic composition of claim 1, wherein the metal salt is present at up to 15% by weight, based on the total weight of the first poly(oxyalkylene) polymer, the second poly(oxyalkylene) polymer, and the metal salt of a carboxylic acid, sulfonic acid, or alkyl sulfate.

12. The thermoplastic composition of claim 1, wherein the first poly(oxyalkylene) polymer and second poly(oxyalkylene) polymer are present in a weight ratio ranging from 1:2 to 2:1.

13. The thermoplastic composition of claim 1, wherein the composition further comprises polycaprolactone.

14. The thermoplastic composition of claim 1, wherein the metal salt is a sodium or potassium salt.

15. The thermoplastic composition of claim 1, wherein the metal salt is a zinc or calcium salt.

16. The thermoplastic composition of claim 1, wherein the metal salt is present in an amount of 0.0001 percent by weight to 0.5 percent by weight, based on the total weight of the thermoplastic composition.

17. The thermoplastic composition of claim 1, wherein the second poly(oxyalkylene) polymer has a weight average molecular weight of about 8,000 grams per mole.

* * * * *